Aug. 2, 1949.  P. C. EFROMSON ET AL  2,477,972
VIBRATION ISOLATOR UNIT
Filed Aug. 27, 1945  3 Sheets-Sheet 1
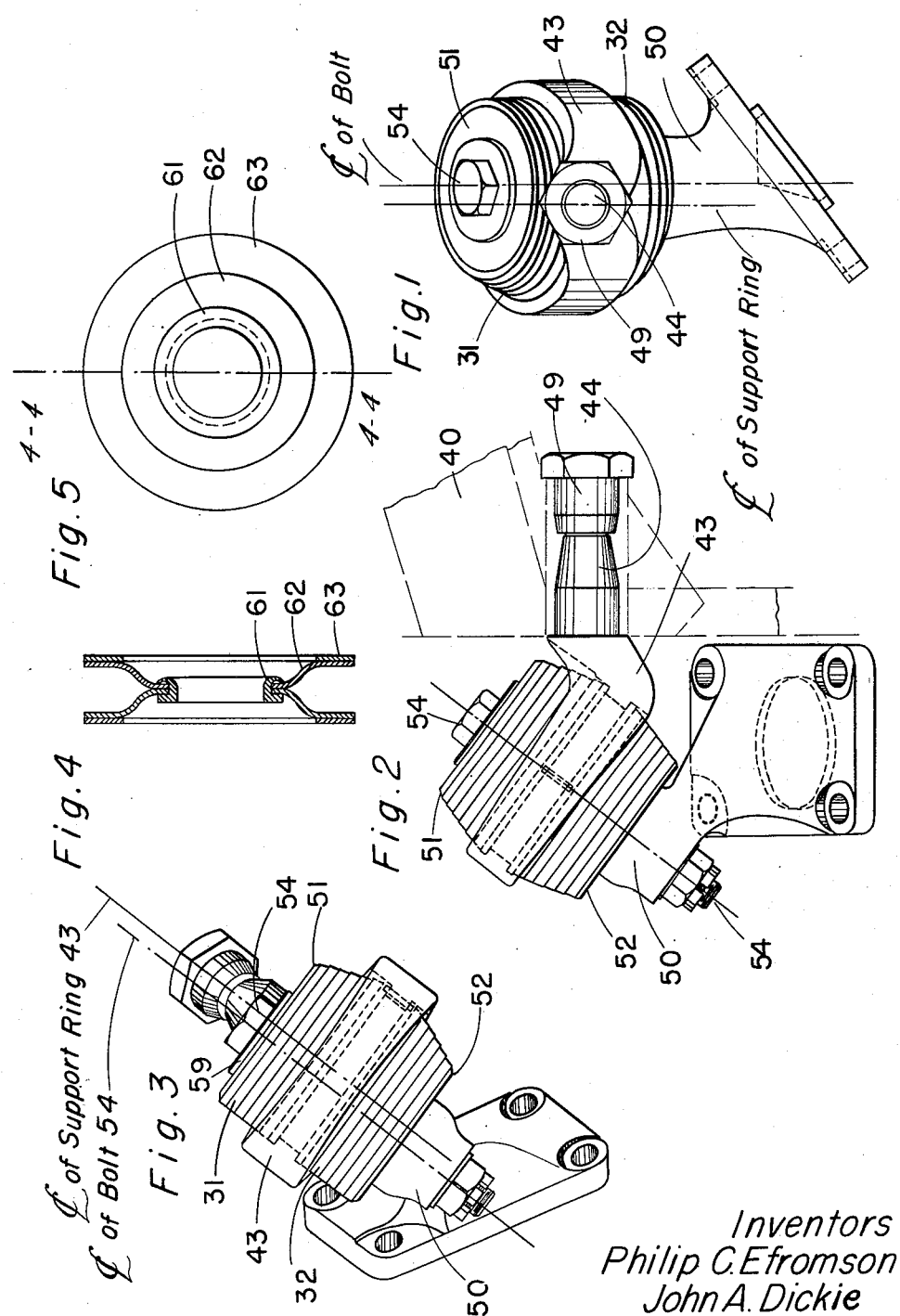
Inventors
Philip C. Efromson
John A. Dickie
By their attorneys
Howson and Howson

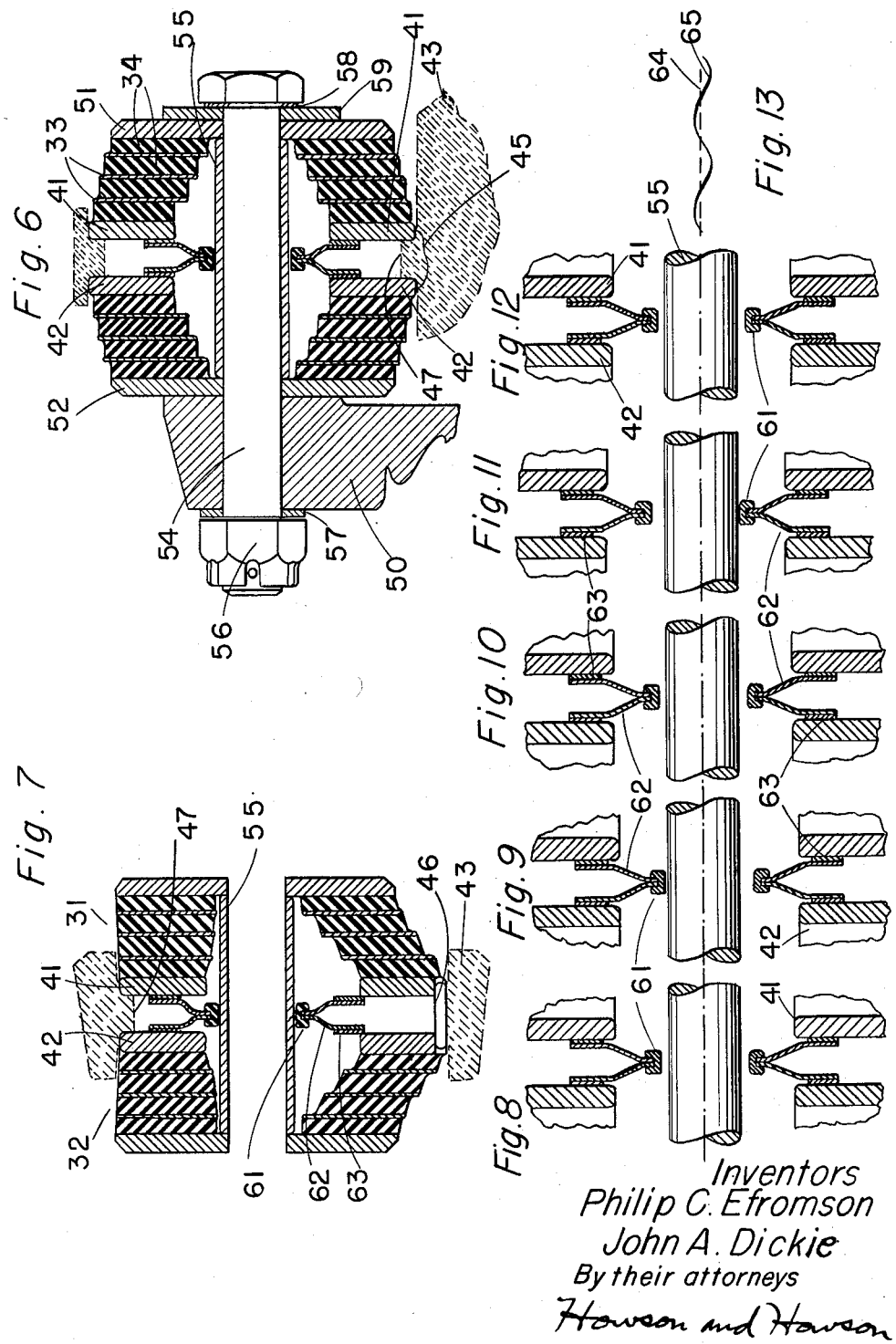

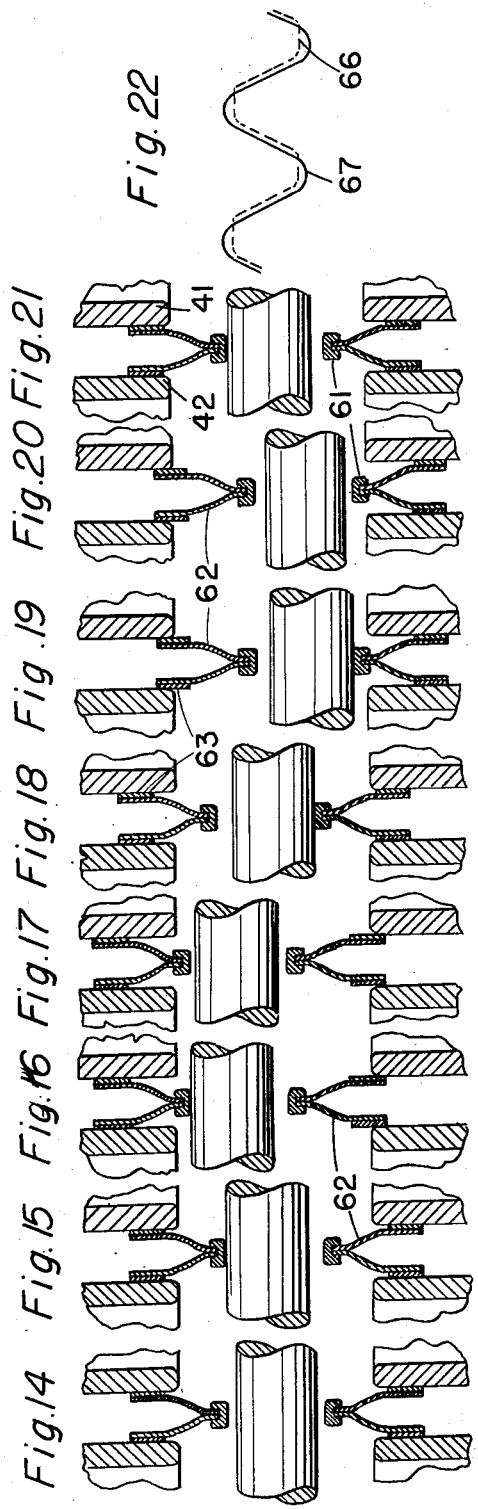

Patented Aug. 2, 1949

2,477,972

UNITED STATES PATENT OFFICE 2,477,972

VIBRATION ISOLATOR UNIT

Philip C. Efromson, New Haven, and John A. Dickie, Hamden, Conn., assignors to The MB Manufacturing Company, Inc., New Haven, Conn., a corporation of Connecticut Application August 27, 1945, Serial No. 612,928

9 Claims. (Cl. 248—358)

1

This invention relates to a vibration isolator unit and more particularly to a vibration isolator unit for supporting an engine of an airplane. Engines of airplanes are customarily attached to a plurality of resilient vibration isolator units which in turn are supported by an engine mount structure, which for a radial engine is usually in the form of a ring. The resilient units are located on the engine mount structure in a manner calculated to afford satisfactory behavior under both static and vibratory forces. Due to the forces of gravity and the constantly changing position of the airplane and the changing operations of the motor, the vibrations to which the different units are exposed differ from each other and vary from second to second. These isolator units customarily employ rubber as the resilient elements and it has been known to employ damper means to reduce the amplitude of the oscillations of the rubber.

An object of our invention is to provide a damping force for the vibrations of the rubber which is uniform under all operating conditions when needed and which at the same time will not operate on vibrations of small amplitude. It is characteristic of an isolator unit containing our damper assembly that the damper means are interposed between two elements having no motion relatively to each other so that the frictional force exerted on them by the damper is independent of the load supported by the resilient elements. It should also be noted that the damper has sufficient clearance to allow normal vibratory displacements of the engine to float freely on the rubber without moving the damper, thus reducing transmitted forces to a minimum.

The invention will be shown and described embodied in a vibration isolator unit having two resilient elements or cores juxtaposed to each other, with the damper means between the cores, and a ring holding the juxtaposed faces of the cores in fixed relation. It should be understood, however, that the invention is not limited to one in which the surfaces in frictional engagement with the damper are necessarily an integral part of the resilient elements, except as limited in the claims. The unit also has means connecting the external faces of the cores; this connecting means being attached to the engine, and the ring which holds the adjacent faces of the resilient elements in fixed relation being attached to the above-mentioned mount ring.

In the drawings:

Figure 1 is a view in elevation of a vibration isolator unit embodying our invention, while

2 bearing no load, the unit being viewed from the mount ring of the airplane;

Figure 2 is a side view of the unit of Fig. 1, taken from the left of that figure, namely, normal to a plane passing through the center of the unit and through the center line of the crank shaft of the engine which the unit supports;

Figure 3 is a view in orthographic projection of Fig. 2, from the left side of that figure.

Figure 4 is a vertical section on the line 4—4 of Fig. 5 through our novel damper, in compressed position;

Figure 5 is a plan view of our damper;

Figure 6 is a view in section of the two resilient elements of our unit and the associated parts as they appear in Fig. 2;

Figure 7 is a view similar to Fig. 6, showing the resilient elements and associated parts as they appear in Fig. 3;

Figures 8 to 13, inclusive, are a series of diagrams on an enlarged scale, of the damper and associated elements, showing the effective clearance between the damper and the bushing on the main bolt during a cycle of vibratory movement of such small amplitude that the damper does not move; Fig. 8 showing the normal position of the bolt; Fig. 9, the bolt moved up until it just contacts the damper at the top; Fig. 10, after the bolt is returned to normal position; Fig. 11, with the bolt moved to upper position just short of contact with the bushing at the bottom; Fig. 12, with the bolt once more returned to normal position; and Fig. 13 showing the nature of the vibrations of the bolt shown in Figs. 8 to 12, the dotted line showing the center line of the damper;

Figures 14 to 21 are a series of diagrams on an enlarged scale, of the damper and associated parts during a cycle of vibratory movement of sufficient amplitude to cause movement of the damper; Fig. 14 showing the bolt in normal position; Fig. 15, the bolt just after it has contacted the damper at the top; Fig. 16, the position of the parts after the bolt has moved the damper up; Fig. 17, the position after the bolt has started to move downwardly; Fig. 18, after the bolt is moved downward sufficiently to move the damper back almost to its normal position; Fig. 19, after the bolt has moved the damper to the extreme downward position; Fig. 20, showing the damper still in its down position and the bolt moving upwardly; and Fig. 21, the bolt after returning the damper almost to its normal position; while Figure 22 is a diagram in which the dotted line 66 shows the position of the center line of the bolt, and the solid line 67 the position of the damper during movements of the nature of Figs. 14 to 21, inclusive.

As already mentioned, this invention is concerned with a vibration isolator unit which has two resilient rubber cores 31, 32 placed in parallel between the support or engine mount ring 40 of an airplane, on the one hand, and the load or engine itself, on the other hand. In this type of unit the resilient cores are hollow and flat where they face toward each other and they have flat surfaces forming outer faces. The outside of each core between these parallel ends or faces is rounded. Each rubber core is, in general, in the form of a hollow cone which is bulged on one side. The resulting oblique conical shape is stepped at one or more levels which correspond with points at which thin metal discs 33 are molded in the rubber (see Fig. 6). These discs or plates contribute to the proper elastic properties of the cores. The laterally displaced shape or unsymmetrical offset is to allow for deflection caused by engine torque, as will be set forth later.

A metal plate is vulcanized to each face of each resilient core. The plates 51, 52 on the outer faces are directly connected together by means which pass through the center of the resilient cores 31, 32 and through large openings in the two center or inner plates 41, 42. In the example shown in the drawings, these means comprise a bolt 54 which is supported on a bracket 50 mounted on a pad (not shown) on the engine of the airplane. It is convenient to describe the bolt 54 and the other parts which function between the resilient cores and the engine—namely, the bracket 50, outside plates 51, 52 and necessary nut 56, washers 57, 58, etc.—as the "moving parts" of the isolator unit. They are the parts which transmit the vibrations of the load to the resilient cores 31, 32. Similarly, the parts which are functionally located between the resilient cores and the mount ring 40 may be termed the "stationary parts." These include the inner plates 41, 42 vulcanized to the resilient elements, a support ring 43, the damper means and associated arm, nuts, etc. The two inner plates 41, 42 are fitted in the support ring 43. The peripheries of the plates each rest in an annular groove 45 cut on the inside of the ring. The two grooves are separated by an annulus 47 which determines the exact distance between the inner plates. The head of the central bolt 54 presses down on the outer plate 51 of the upper core 31 through a cover plate 59. Where the bolt 54 comes out of the lower side of the outer plate 52, it passes at once through the upper arm of the supporting bracket 50 on the engine. There is a castellated nut 56 and a washer 57 on the bolt where it protrudes from the lower side of the bracket arm. By tightening this nut the inner plates 41, 42 are held against the annulus 47 on the ring with any desired pressure. To keep the cores 31, 32 and their inner plates in proper circumferential registry with the support ring, there is a small registry pin 46 on each annular flange 45, the pin taking into a little depression in the face of the inner plate (see Figs. 2 and 7). The support ring 43 has a bolt 44 formed unitarily with it, extending outwardly and upwardly relatively to the main bolt 54, as the unit appears in Fig. 2. This bolt 44 fastens the unit to the mount ring by means of a sleeve nut 49. The mount ring carries all the isolator units. The support ring 43 preferably does not cover or touch the outside of the cores and functions on them through the inner plates 41, 42, in the following manner.

Let us assume that the load of the engine has not yet been applied to the isolator units. One isolator unit under these conditions is shown in the perspective view Fig. 1 and in Figs. 2 and 3. Motion of the isolator unit due to rotation of the airplane engine about the axis of its crankshaft will be substantially parallel to the plane of Fig. 1. Since the displacement of the moving parts of the unit takes place entirely in the plane of Fig. 1, it follows that such movement would not show in Fig. 2 which is taken in a plane vertically at right angles to Fig. 3. In Fig. 1 it will be noted that the center line of the bolt 54, and therefore of the outer plates 51, 52, is to the right of the center line of the support ring 43 which holds the inner plates 41, 42. In other words, the center line of the moving parts is to the right of the center line of the stationary parts. With the weight of the engine and the torque resulting from normal running of the engine, the center bolt 54 is moved to the left until the two center lines coincide and the offset in the rubber cores 31, 32 becomes zero owing to the movement of the outer plates. When the engine is giving excessive torque, as occurs when the plane is taking off, the bolt moves beyond this midposition till it is to the left of the center line of the support ring about as far as it appears to the right of that line in Fig. 1.

It has been found that it is desirable to dampen the motions of larger amplitude resulting from torsional oscillation of the engine more than is obtained from the rubber cores alone. Efforts to dampen these motions have been made heretofore but without much success. The damping has varied widely, in an irregular way, in the range of normal oscillation, dependent on factors other than the oscillations. Also, there has been damping on the small oscillations attendant upon the proper performance of the isolator unit in performing its intended function, as well as on those of large amplitude which excessive motion the damper is desired to limit. This too is undesirable. Our damping device is of such a nature that it is not effective during small oscillations, and on movements of large amplitude it gives uniform damping forces throughout the movements, regardless of the position of other parts of the isolator or the engine. In the example of our device shown in the drawings, the damper assembly is compressed between two members held to the same structure, namely, the inner plates 41, 42 held by the support ring 43. The two members need not be integral with the resilient elements to get the advantage of our invention. There is no relative motion between the two members and the frictional forces exerted by the damper on these plates is independent of the load supported by the resilient cores 31, 32. Our damper means does not interfere with the freedom of movement of the resilient elements on vibrations of small amplitude and provides a uniform amount of resistance at all times when the movement of the parts is of sufficient amplitude to call it into action.

The main or friction element of our damper is shown in Figs. 4 and 5 and comprises two spring metal washers 62 with a central hole in each one. The washers are held together at the center by a metal bushing 61. The outer portions of the washers are bent away from each other and when not compressed are sprung outwardly a little more than appears in Fig. 4. The position of the parts in this figure is the one they occupy when the damper is assembled in the isolator unit with the washers under compression. To provide the proper friction surfaces, the outside face of each washer 62 is covered near the periphery with brake lining material 63.

The normal or mid-position of the main damper element in the isolator unit is shown in Fig. 7.

It will be seen that the distortion of the spring washers by the inner plates 41, 42 causes the brake lining material 63 to be pressed against the plates. Motion of the damper assembly parallel to the surfaces of the plates is resisted by the frictional force between the brake lining material and the plates. Any desired compression load can be set and held accurately because of the annulus 47 on the support ring. This insures a uniform minimum spacing of the plates at all times. This is particularly desirable in constructions where a multiplicity of isolator units are employed—as, for example, in an airplane. Here the isolator units are spaced on the mount ring around the engine at different angles and each is subject to different stresses at the same time. This gives variance in loading of the dampers in the prior art which caused a virtual displacement of the dynamic elastic center of the suspension of the engine—an undesirable feature. Our device provides a damping force which is uniform, and this regardless of the position of the isolator unit relative to the other units in the installation.

We will next describe the details of construction which render the damper inoperative under conditions when damping is undesirable, i. e., during oscillations of small amplitude. This is achieved by the combining of the two relatively stationary inner plates 41, 42 and the damper spring assembly 60 with a clearance between the damper and the moving parts of the isolator unit. For this purpose there is a separator bushing 55 on the bolt 54 lying between the outer plates 51, 52. The outside diameter of this bushing is less than the central opening in the damper bushing 61 through which is passes. In this way there is no relative movement of parts to cause any frictional damping until the separator bushing contacts the damper bushing. The two bushings do not contact each other until the oscillation is sufficiently large to need damping.

The freedom of small oscillations from damping can be seen in Figs. 8 to 13 where the amplitude of the vibratory motion is less than the clearance between the separator bushing 55 and the damper bushing 61. While the central shaft is shown of the diameter of the bolt 54, and the separator bushing 55 combined, for purposes of discussion it will be called the bolt. In Fig. 8 the parts are in their mid-position where the bolt is axially central of the bushing 61 and the damper is in its mid-position. In Fig. 9 the bolt is moved upwardly till it is almost in contact with the damper bushing 61 at the top, but without moving the damper. In Fig. 10 the shaft has returned to its mid-position, and in Fig. 11 the downward movement started in Fig. 10 has continued until the bolt is almost touching the damper assembly at the bottom of the figure. In Fig. 12 the return oscillation has carried the bolt to its original mid-position. The wavy solid line 65 in Fig. 13 indicates the mid-position of the bolt shown in Figs. 8 to 12 as it oscillates back and forth between the extreme positions of that series of figures. The straight dotted line 64 indicates the axial center line of the damper, and it will be seen that the damper has not moved for any of these oscillations of small amplitude. Hence no damping force is introduced. This is a desirable condition, for such small amplitude motion is characteristic of operation at cruising speeds of an airplane engine. Its frequencies are substantially above the resonant frequency of the suspension as a whole. At such frequencies, transmission of vibration across the isolator unit is held to a minimum by keeping the damping force to a minimum.

The effect on the damper of large amplitude motion is shown in Figs. 14 to 22. Such large amplitude motion is characteristic of engine operation at idling speeds whose frequencies are near the resonance frequency of the suspension. At such frequencies, transmission of vibratory force across the isolator mount is minimized by the introduction of a considerable amount of damping. In Fig. 14 the bolt, as in Fig. 8, is shown in its axially central position with the damper assembly in its mid-position. In Fig. 15 the bolt has moved upwardly and contacted the damper bushing 61 at the top of the figure. In Fig. 16 the bolt has pushed the damper assembly to its highest position, the movement being resisted by frictional contact between the brake lining material 63 on the damper washers 62 pressing against the inner plates 41, 42. In Fig. 17 the bolt has started to move downwardly and is substantially axially central of the damper bushing, the damper still being in its highest position. In Fig. 18 the bolt has contacted the damper bushing at the bottom of the figure and pushed the damper back to its normal mid-position. In Fig. 19 the downward movement has continued, which brings the damper assembly to its lowermost position, this oscillation being damped in the same manner as the damping caused in passing from the position of Fig. 15 to that of Fig. 16. In Fig. 20 the bolt is moved upwardly to a position axially central of the damper assembly, but the damper is still in its lowermost position. In Fig. 21 the bolt is moving upwardly to a position where the damper assembly is approaching its mid-position, the bolt still pushing upwardly. It will be seen by study of Fig. 22, where the solid line 67 represents the center line of the bolt 54 and the dotted line 66 represents the center line of the damper assembly, that the damper assembly lags in its movements and does not follow the bolt when there is a change of direction of movement of the bolt. However, it will be seen that the damper is forced to slide during nearly all of the motion of the bushing, thus introducing a drag on the moving parts over nearly the entire cycle of motion.

It will be seen that our damper not only provides a uniform resistance to vibrations of large amplitude, thereby making it possible to use softer rubber in the cores, but also permits this soft rubber to act without interference on vibrations of small amplitude. The simplicity of our device and the ease of its assembly are, of course, of great practical advantage.

What we claim is:

1. In a vibration isolator unit having external connections to a support and to a vibratory load, two resilient cores having juxtaposed inner faces, and an external connection attached to and holding in fixed relation the juxtaposed inner faces of said cores, in combination with means connecting together the outer faces of the cores and an external connection attached to said outer faces, and a damper associated with the juxtaposed inner faces, whereby vibrations of the cores are damped.

2. In a vibration isolator unit, a pair of resilient hollow cores in juxtaposed relation, a ring holding the juxtaposed faces in fixed relation to each other, in combination with means passing through the two cores connecting their outside faces, and a damper pressing against the juxtaposed faces and adapted to be moved by the means connecting the outside faces of the cores, whereby relative lateral movements of the juxtaposed and outer faces are damped.

3. In a vibration isolator unit, two resilient cores in juxtaposed relation, a ring holding the adjacent faces in fixed relation, and means connecting the external faces of said resilient elements and passing through said elements, in combination with a damper element between the fixed adjacent faces exerting pressure against the faces and adapted to be moved by the means connecting the external faces, whereby the amplitude of movement of the external faces is damped.

4. In a vibration isolator unit having two external conections one to a support and the other to a vibratory load, two resilient cores in juxtaposed relation and a ring holding juxtaposed faces of the cores in fixed spaced relation to each other, one of said external connections being on said ring, in combination with a damper between the juxtaposed faces pressing against them, means connecting the outer faces of the cores together passing through the cores and damper, and the other of said external connections being on the connecting means, said means being adapted to move the damper relatively to the juxtaposed faces of the cores.

5. In a vibration isolator unit adapted to be mounted on a support and to carry a load, a ring adapted to be connected to the support, two rubber cores arranged with one face of each held by the ring in fixed spaced relation juxtaposed to a face of the other core, and a plate bonded to each such face, in combination with movable means passing through the ring and cores connecting the outer faces of the cores and adapted to be fastened to the load, and a damper between the plates on the juxtaposed faces to be actuated laterally by the movable means, whereby the damper damps lateral movements of the movable means.

6. In a vibration isolator unit adapted to be mounted on a support and to carry a load, a ring adapted to be connected to the support, two rubber cores arranged with one face of each held by the ring in fixed spaced relation juxtaposed to a face of the other core, and a plate bonded to each such face, in combination with movable means passing through the ring and cores connecting the outer faces of the cores and adapted to be fastened to the load, and a damper between the plates on the juxtaposed faces adapted to be actuated laterally by the movable means, whereby the damper damps lateral movements of the movable means, there being a clearance between the movable means and the damper, whereby the latter is moved only on large movements of the former means.

7. In a vibration isolator unit, two hollow rubber cores arranged in juxtaposed relation, a metal plate fixed to the juxtaposed face of each core, there being central openings in the plates, another metal plate fixed to the outer face of each core, a ring holding the juxtaposed plates in fixed spaced relation, and spring damper means between and pressing against said plates, in combination with means passing through the damper means and cores with clearance and connecting the outer plates, whereby lateral movement of the connecting means after taking up the clearance causes frictional movement of the damper means on the inner plates.

8. In a vibration isolator unit having external connections to a support and to a vibratory load, two resilient cores, each having two faces, one face of each connected to the external load and the other face connected to the support, in combination with two plates having a fixed minimum spacing and fixedly related to one of said external connections, and a damper slidably mounted between said plates, whereby the vibrations of the load are dampened.

9. In a vibration isolator unit having external connections to a support and to a vibratory load, two resilient cores mounted in juxtaposed and spaced relation, in combination with two plates between said resilient cores, said plates being held in fixed relation to each other, and a damper slidably mounted between said plates adapted to dampen the vibrations of the load.

PHILIP C. EFROMSON.
JOHN A. DICKIE.

REFERENCES CITED

The following references are of record in the file of this patent:

UNITED STATES PATENTS

| Number | Name | Date |
| --- | --- | --- |
| 2,317,501 | Tyler | Apr. 27, 1943 |
| 2,365,989 | Ailes | Dec. 26, 1944 |
| 2,377,492 | Gorton | June 5, 1945 |